J. M. JORGENSEN.
RAIL JOINT.
APPLICATION FILED APR. 13, 1910.

983,724.

Patented Feb. 7, 1911.

2 SHEETS—SHEET 1.

WITNESSES:

INVENTOR
Jorgen M. Jorgensen
BY
ATTORNEYS

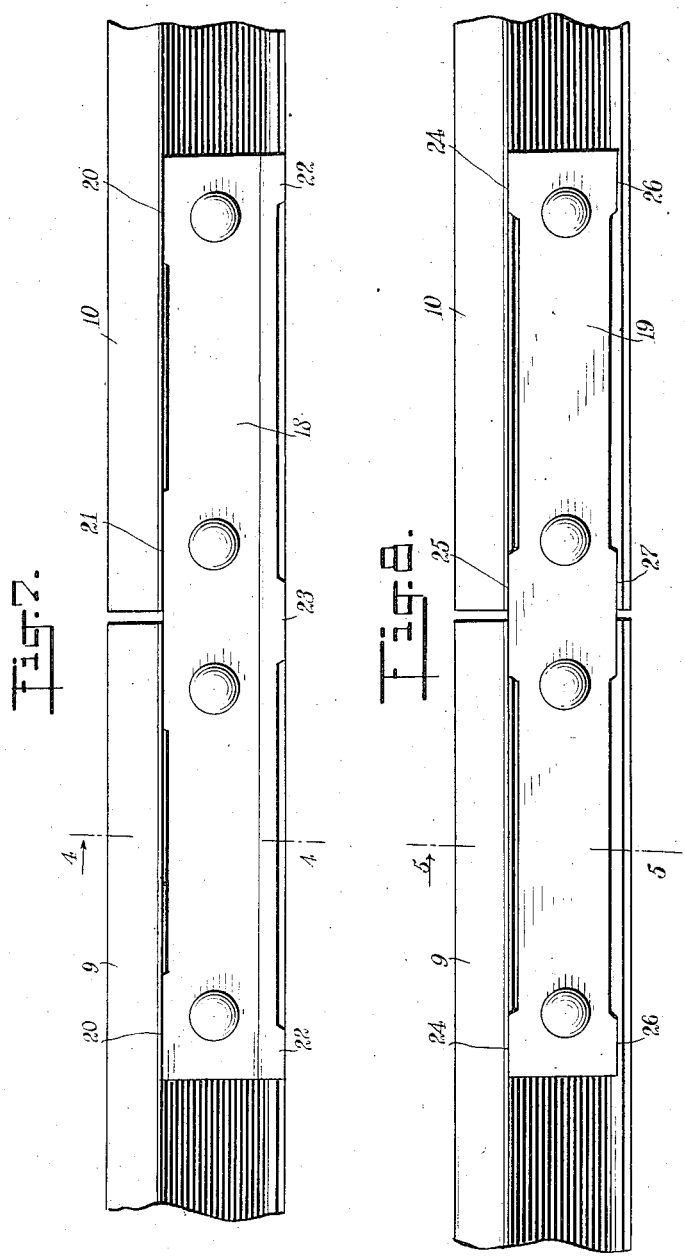

UNITED STATES PATENT OFFICE.

JORGEN M. JORGENSEN, OF NEW YORK, N. Y.

RAIL-JOINT.

983,724.

Specification of Letters Patent.

Patented Feb. 7, 1911.

Application filed April 13, 1910. Serial No. 555,141.

*To all whom it may concern:*

Be it known that I, JORGEN M. JORGENSEN, a subject of the King of Denmark, and a resident of the city of New York, Richmond Hill, borough of Queens, in the county of Queens and State of New York, have invented a new and Improved Rail-Joint, of which the following is a full, clear, and exact description.
My invention relates to rail joints, my more particular purpose being to provide at the junction between consecutive rails a pair of fish plates so shaped, proportioned and arranged, as to compensate for wear of the fish plates and of the rails, in such manner that by tightening the fish plates relatively to the rails, the latter can be periodically braced up and rendered as if new.

Figure 1:
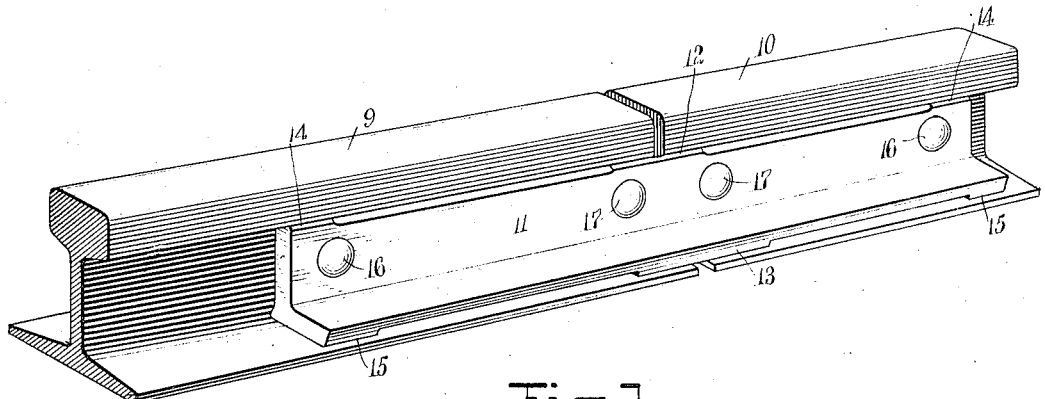
Figure 2:
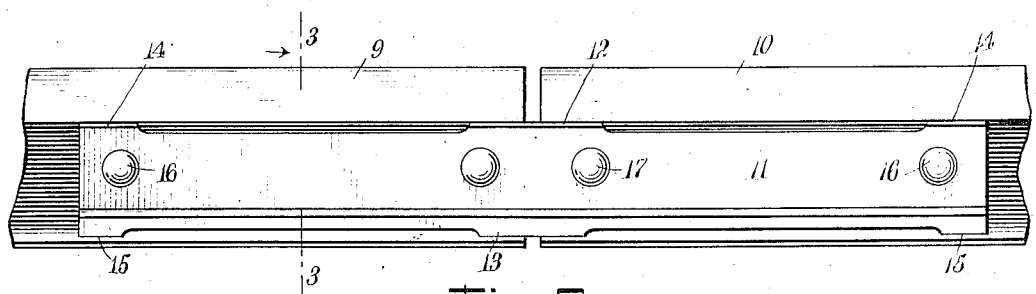
Figure 4:
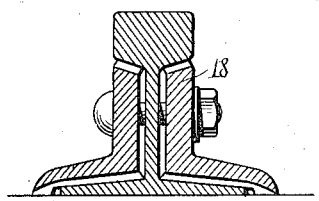
Figure 3:
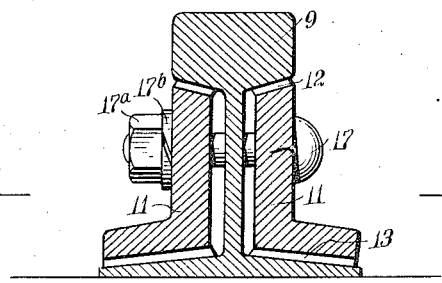
Figure 5:
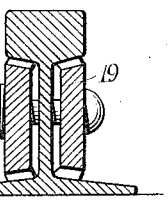
Figure 6:
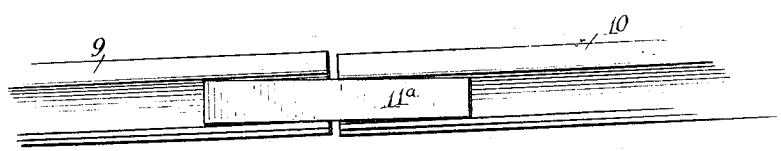

My invention further relates to the apportionment of the various bearing surfaces of the fish plates, so as to attain, as far as practicable, equality in the distribution of mechanical strains between the rail and the fish plates.
My invention further relates to so forming the fish plates as to economize the amount of metal contained within them and to utilize such metal as they contain to the best advantage.
My invention further relates to various improvements in fish plate construction for the purpose of increasing the general utility of the fish plates and of the rails with which they are associated.
Reference is to be had to the accompanying drawings forming a part of this specification, in which similar characters of reference indicate corresponding parts in all the figures.
Figure 1 is a perspective showing one form of my improved fish plate here used for connecting together a pair of ordinary service rails; Fig. 2 is a side elevation of the mechanism shown in Fig. 1; Fig. 3 is a vertical section on the line 3—3 of Fig. 1, looking in the direction of the arrow; Fig. 4 shows a modification in the fish plates, and is taken on the section line 4—4 of Fig. 7, looking in the direction of the arrow;
Fig. 5 is a section showing another form, and is taken upon the line 5—5 of Fig. 8; Fig. 6 is a diagrammatic side elevation illustrating how the shearing stresses between the rails are taken up, to a certain extent, by aid of my improved fish plate; Fig. 7 is a side elevation showing the form of fish plate illustrated in Fig. 4; and Fig. 8 is a side elevation showing the modified form of fish plate appearing in Fig. 5.

At 9, 10 are rails which, in this instance, are of the type in common use. One form of my improved fish plate is shown at 11. This fish plate is provided with bearing surfaces 12, 14 for engaging the head of the rail, and with other bearing surfaces 13, 15 for engaging the foot of the rail. Between the bearing surfaces 12 and the bearing surfaces 14 (see top of Fig. 1) the upper edge of the fish plate is cut away so that the upper portion of the fish plate does not touch the rail at all, except where the bearing surfaces 12, 14 make contact with it. Similarly, between the bearing surfaces 13 and the bearing surfaces 15 the lower edge of the fish plate is cut away for a similar purpose.

As may be seen from Fig. 3, nearly all portions of the fish plate are clear of the rail. The fish plates 11 are arranged in pairs, the plates of each pair being clamped against opposite sides of the rail and held in position by aid of bolts 16, 17 which extend through the rail and through the fish plates. By aid of nuts $17^a$ and washers $17^b$ the fish plates are forced tightly into position, so as to hold the rail ends rigid; and when, owing to wear either of the fish plates or rails, or both, there is any lost motion developed, the nuts $17^a$ are tightened so as to again render the rail ends rigid relatively to each other and to the fish plates.

In Fig. 6 the shearing action of the rails 9, 10 is illustrated, and a member $11^a$, diagrammatically representing the fish plate 11, is shown in connection with the rails 9, 10 for exhibiting how the mechanical stresses tend to play upon the fish plates. As will readily be understood, when one end of the rail 10 goes downward relatively to the adjacent end of the rail 9, there is a shearing action exerted directly upon the fish plate adjacent to the middle of the latter, and there is also a tendency to force one end of the member upward and the opposite end downward.

From Fig. 6 it is evident that if the member $11^a$ be thoroughly braced at its ends and also at its middle, by bearing surfaces which engage the rails at these points along the member $11^a$, the rails can be held rigidly, provided only that the member $11^a$ be forced directly against the rail ends. This explanation accounts for my use of the bearing surfaces 12, 13, 14, 15, and for my positioning them in the relation stated. If, for instance, according to Fig. 1, the end of the rail 10 goes downward as indicated in Fig. 6, pressure is exerted upon the right-hand portion of the bearing surface 12 and also upon the left-hand portion of the bearing surface 13, this pressure tending to prevent the descent of the rail 10 or the ascent of the rail 9. The rail ends are thus held in true alinement if the bolts be kept tight. Another principle is also here apparent. Referring to Fig. 3, it will be noted that the bearing surfaces 12 (measured in a direction crossing the general length of the rail) are considerably narrower than the surfaces 13. In order to equalize these surfaces, I make the bearing surfaces 12 longer than the bearing surfaces 13 in the general direction of the length of the rail. For the same reason, I make the bearing surfaces 14 longer than the bearing surfaces 15 measured in the general direction of the length of the rail. In doing this I make all of the surfaces engaging the rail head about equal in area to the surfaces engaging the foot of the rail, and also make at a particular point (say at the left end of the rail 10) the area of that portion of the bearing surface 12 in contact with the rail head equal or approximately equal to that portion of the bearing surface 13 which happens to be in engagement with the foot of the same rail. In doing this I distribute the metal of the fish plate so as to secure the greatest possible strength and durability, as well as the greatest economy of the metal of which the fish plates are made.

In view of the foregoing explanation, Figs. 7 and 8 may be readily understood. In Fig. 7 the rails 9, 10 are engaged by a pair of fish plates, one of which is shown at 18. This fish plate is provided at its ends with upper bearings 20 and at the middle with a bearing 21. It is also provided at its ends with lower bearings 22 and at its middle with a bearing 23. The apportionment of the bearing surfaces is such that each upper bearing is about equal in area to the corresponding lower bearing, and practically speaking the amount of surface in contact with the head of the rail at any point is approximately equal to that in contact with the foot of the rail immediately below it. In Fig. 8 the rails 9, 10 are clamped between fish plates one of which is shown at 19. Each fish plate has, as before, upper bearings 24, 25 and lower bearings 26, 27, in which the proportions and measurements are controlled by the principles above outlined.

I do not limit myself to any particular type of rail nor to any special form of fish plate, as these may be varied without departing from the spirit of my invention.

Having thus described my invention, I claim as new and desire to secure by Letters Patent:

1. A fish plate, comprising a longitudinal member provided adjacent to one of its ends with a long bearing surface for engaging the head of a rail, and also provided at the same end with a short bearing surface for engaging the foot of a rail, said short bearing surface being extended in a direction independent of its length, for the purpose of approximately equalizing the aggregate area of this bearing surface as compared with the bearing surface first mentioned.

2. A fish plate, comprising a longitudinal member for holding rails together, said member being provided adjacent to its middle with an upper bearing surface for engaging the head of a rail, and with a lower bearing surface for engaging the foot of a rail, said upper bearing surface extending to a greater distance than said lower bearing surface in a direction parallel with the general length of the body member, said lower bearing surface extending to a greater distance than the upper bearing surface in a direction crossing the general length of said body member.

3. A fish plate comprising a longitudinal member provided adjacent to its ends with surfaces for engaging the heads of rails, and further provided adjacent to its middle with surfaces for engaging the feet of said rails, the aggregate area of said first-mentioned surfaces being approximately equal to the aggregate area of said second-mentioned surfaces.

4. A fish plate, comprising a longitudinal member provided adjacent to its ends with bearing surfaces for engaging the heads of rails and with other bearing surfaces for engaging the feet of said rails, each of said first-mentioned bearing surfaces having a length and a width independent of the length and width of one of the adjacent second-mentioned bearing surfaces, the area of each of said first-mentioned bearing surfaces being substantially equal to the area of the adjacent second-mentioned bearing surface.

In testimony whereof I have signed my name to this specification in the presence of two subscribing witnesses.

JORGEN M. JORGENSEN.

Witnesses:
  WALTON HARRISON,
  PHILIP D. ROLLHAUS.